United States Patent
Evertz et al.

(10) Patent No.: US 8,602,385 B2
(45) Date of Patent: Dec. 10, 2013

(54) COUPLING AN ACTUATOR TO A VALVE USING A RETAINING ELEMENT ENGAGING IN A RECESS

(75) Inventors: Jörg Evertz, Birmensdorf (CH); Martin Sprecher, Cham (CH)

(73) Assignee: Siemens Aktiengesellschaft, Munich (DE)

(*) Notice: Subject to any disclaimer, the term of this patent is extended or adjusted under 35 U.S.C. 154(b) by 239 days.

(21) Appl. No.: 13/064,504

(22) Filed: Mar. 29, 2011

(65) Prior Publication Data
US 2011/0240901 A1 Oct. 6, 2011

(30) Foreign Application Priority Data

Mar. 29, 2010 (EP) .................................... 10158266

(51) Int. Cl.
*F16K 27/08* (2006.01)
(52) U.S. Cl.
USPC ........ 251/292; 251/291; 403/378; 403/379.2; 403/379.5
(58) Field of Classification Search
USPC .................. 137/382.5, 315.27; 251/291, 292; 403/378, 379.1–379.6
See application file for complete search history.

(56) References Cited

U.S. PATENT DOCUMENTS

| | | | | |
|---|---|---|---|---|
| 1,801,237 A | * | 4/1931 | Hanson | 138/94.3 |
| 1,969,798 A | * | 8/1934 | Hultquist | 279/19.5 |
| 3,472,269 A | * | 10/1969 | Scholle | 137/312 |
| 4,139,016 A | * | 2/1979 | Byrnes | 137/296 |
| 4,367,968 A | * | 1/1983 | Ishida | 403/122 |
| 4,633,897 A | * | 1/1987 | Effenberger | 137/315.35 |
| 4,903,719 A | * | 2/1990 | Rains | 137/15.17 |
| 5,052,430 A | * | 10/1991 | Trautwein | 137/315.35 |
| 5,316,319 A | * | 5/1994 | Suggs | 277/308 |
| 5,388,842 A | * | 2/1995 | Piras et al. | 279/19.5 |
| 5,803,110 A | * | 9/1998 | Segal | 137/68.14 |
| 5,954,088 A | * | 9/1999 | Huang | 137/315.21 |

(Continued)

FOREIGN PATENT DOCUMENTS

| | | |
|---|---|---|
| CN | 1297122 | 5/2001 |
| CN | 1473253 | 2/2004 |

(Continued)

OTHER PUBLICATIONS

Chinese Office Action issued Apr. 11, 2013 in corresponding Chinese Patent Application No. 201110076508.6.

*Primary Examiner* — John Rivell
*Assistant Examiner* — Matthew W Jellett
(74) *Attorney, Agent, or Firm* — Staas & Halsey LLP

(57) ABSTRACT

A device is described for mechanically coupling an actuator to a valve which is adjustable by a plunger that is displaceable along a z-axis. The device has (a) a retaining element which can be mounted on a connecting chassis of the actuator and which is embodied for engaging on two opposite sides of a connection piece of a valve body in a recess incorporated in the connection piece, and (b) a clamping device which is disposed on a section of the retaining element and which is embodied in such a way that when the clamping device is actuated the section of the retaining element is displaced parallel to the z-axis relative to the connecting chassis such that the connecting chassis bears against the connection piece. An actuator having a coupling device of said kind and a method for mechanically coupling an actuator to a valve are also described.

13 Claims, 5 Drawing Sheets

(56) References Cited

U.S. PATENT DOCUMENTS

| | | | | |
|---|---|---|---|---|
| 6,007,047 A | * | 12/1999 | Phipps | 251/252 |
| 6,206,024 B1 | * | 3/2001 | Naberhaus | 137/15.24 |
| 6,361,019 B1 | | 3/2002 | Massey | |
| 6,886,805 B2 | * | 5/2005 | McCarty | 251/214 |
| 6,915,632 B2 | | 7/2005 | Steinborn | |
| 6,935,615 B2 | * | 8/2005 | McCarty | 251/214 |
| 2002/0119003 A1 | | 8/2002 | Buschatz et al. | |
| 2003/0066981 A1 | * | 4/2003 | Cross et al. | 251/292 |
| 2010/0206955 A1 | | 8/2010 | Jager | |
| 2012/0068099 A1 | * | 3/2012 | Sealy | 251/291 |
| 2012/0211688 A1 | * | 8/2012 | Carlson | 251/291 |

FOREIGN PATENT DOCUMENTS

| | | |
|---|---|---|
| CN | 1690453 | 11/2005 |
| CN | 1906420 A | 1/2007 |
| EP | 10158266 | 3/2011 |
| WO | 2009/050380 | 4/2009 |

\* cited by examiner

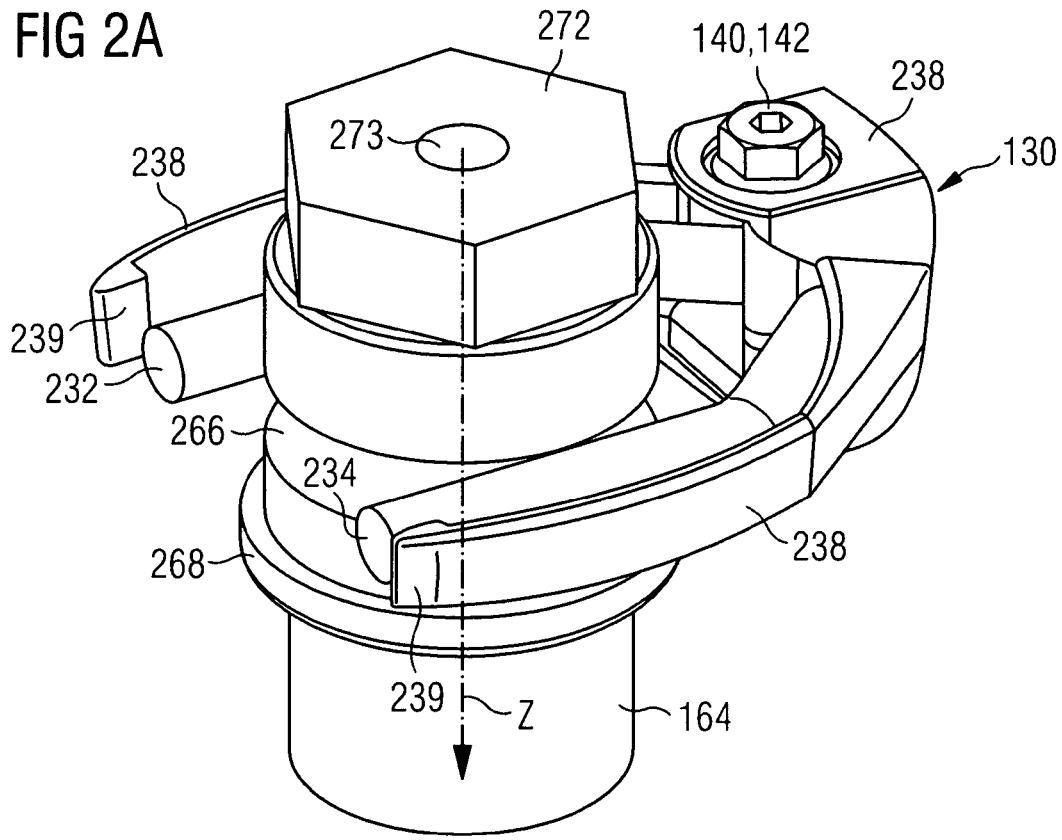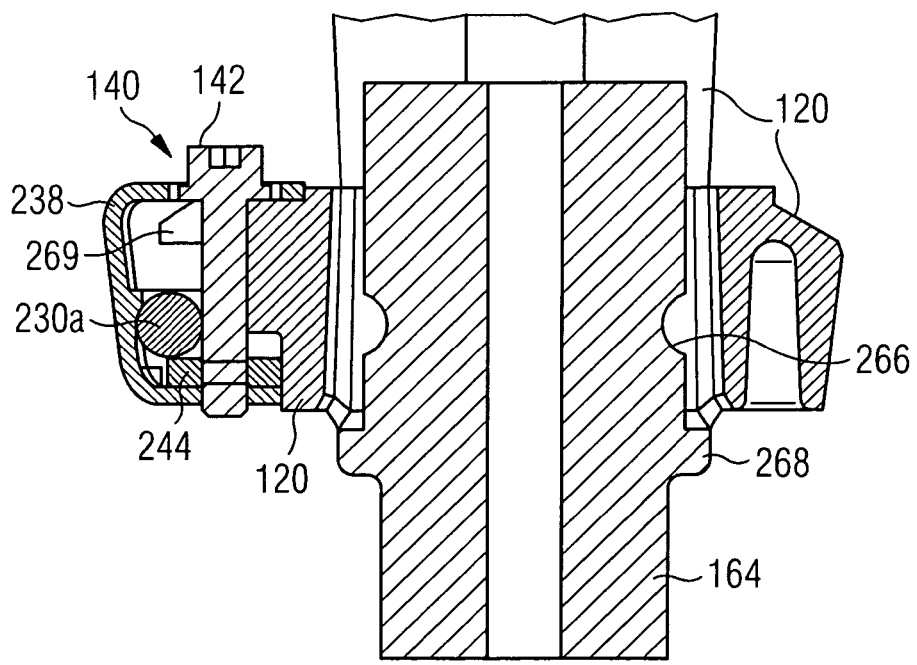

COUPLING AN ACTUATOR TO A VALVE USING A RETAINING ELEMENT ENGAGING IN A RECESS

CROSS REFERENCE TO RELATED APPLICATIONS

This application is based on and hereby claims priority to European Application No. 10158266 filed on Mar. 29, 2010, the contents of which are hereby incorporated by reference.

BACKGROUND

Heating, ventilation and air conditioning (HVAC) valves are typically actuated by an electric-motor-driven actuator. In order to enable a precisely defined setting of the valve to be assigned in such applications to a specific position of the actuator, which is an indispensable requirement for precise activation or regulation of the valve, the relative position between actuator and valve must be precisely defined. It is important to bear in mind in this case that a typical HVAC installation has a plurality of controllable valves and that often during the installation or maintenance of an HVAC system the installer responsible does not work with the greatest of care at all times.

SUMMARY

One possible object is to enable a mechanical coupling between a valve actuator and a valve which is easy to implement without error and is at the same time reliable.

The inventors propose a device for mechanically coupling an actuator to a valve which is adjustable by a plunger that is displaceable along a z-axis. The described device has (a) a retaining element which can be mounted on a connecting chassis of the actuator and which is embodied to engage in a recess incorporated in a connection piece of a valve body on two opposite sides of the connection piece, and (b) a clamping device which is disposed on a section of the retaining element and which is embodied in such a way that when the clamping device is actuated the section of the retaining element is displaced parallel to the z-axis relative to the connecting chassis such that the connecting chassis bears against the connection piece.

The described coupling device is based on the knowledge that the retaining element can easily be mounted at the recess by a radial movement in relation to the axial direction of the valve plunger. In this case the retaining element can be inserted into the recess. Furthermore the relative axial position (in relation to the z-axis) between the connecting chassis of the actuator and the connection piece is defined in such a way that after an actuation of the clamping device the connecting chassis bears for example against a projection of the connection piece.

Before the clamping device is actuated the retaining element can be mounted on the connection piece of the valve body with a certain degree of play so that this operation can easily be performed by any operator without the use of a tool. After the retaining element has been mounted on the connection piece the clamping device can then be actuated. In this case the aforesaid section of the retaining element is displaced in the direction of the connecting chassis. At least one other section of the retaining element can in this case brace itself against a supporting point of the connecting chassis. This, however, also causes that part of the retaining element which engages in the recess incorporated in the connection piece to move in the direction of the connecting chassis. In this way the connecting chassis is pressed against the connecting element and thereby defines the relative spatial position between connection piece and connecting chassis free from play. This applies in particular to the now clearly defined relative axial position between actuator and valve. The relative axial position between actuator and valve defined free from play in this way namely ensures that a precisely defined setting of the valve can be assigned to a specific position of the actuator. This enables the actuator to control the valve in a particularly precise manner.

It is pointed out that when the clamping device is actuated the retaining element rotates about the supporting point or supporting points of the aforementioned other section of the retaining element. In this case the clamping device can be dimensioned such that the retaining element does not lose its functionality even if the clamping device is actuated further despite the connecting chassis already bearing against the connection piece. Thus, for example, the clamping device can have a stop mechanism which ensures that the retaining element is elastically and plastically deformed only to a permissible extent. In this way damage to the retaining element and consequently to the entire coupling device can be precluded if the clamping device is actuated too forcefully.

The connecting chassis of the actuator on which the retaining element can be installed can be any arbitrary frame structure or console. The frame structure can be part of a housing of the actuator or a separate housing of the actuator. Since the housing part or the separate housing is located beneath the actuator in many installation situations, the connecting housing can also be referred to as the lower housing (part).

The connection piece can have any desired geometry which permits the connecting device to be mounted with the aid of the described coupling device. The connection piece can be in particular a flange which stands proud of a surface of the valve body or of a housing of the valve.

According to a further exemplary embodiment, the clamping device has a screw and a clamping element coupled to the screw by way of a thread of the screw.

The screw can be a commercially available screw having any type of head and an external thread. The clamping element can be a nut or a plate having an internal thread that is complementary to the external thread.

Of the two components screw head and clamping element, in the assembled state (actuator is connected to the connection piece of the valve via the connecting chassis) one component bears against a projection or an edge of the connecting chassis and the other component bears against the retaining element. In this way the part of the retaining element that bears against the clamping device can be displaced relative to the connecting chassis and as a result, as explained above, the connecting chassis can be fixed to the connection piece.

According to another exemplary embodiment, the recess is a groove. This has the advantage that the retaining element can engage in a particularly simply shaped recess which is already embodied in many known valves or valve connection pieces. The described coupling device can therefore be used for coupling actuators to a multiplicity of already known and commonly used valves or valve connection pieces. Advantageously, it is consequently not necessary to adapt already established and conventional geometries of valve connection pieces to the described coupling device.

According to a further exemplary embodiment, the groove is an annular groove running at least partially around the circumference of the connection piece. In this case the connection piece is preferably aligned along the z-axis (displacement direction of the valve plunger), which means that the annular groove also runs circumferentially around the z-axis or, as the case may be, the displacement axis of the valve plunger.

An annular groove running along the entire circumference of the connection piece has the advantage that in the case of a simple geometry of the above-described recess the coupling device can be brought close to the valve or valve connection piece from different sides. The retaining element can therefore engage radially in the recess from all possible sides. Accordingly, the actuator can be mounted on the valve connection piece at different angular positions. This is of great advantage in practice in particular when the space available for the actuator is limited due, for example, to pipework, insulation and/or other actuators.

According to another exemplary embodiment, the retaining element has a first arm and a second arm. In this arrangement the first arm is embodied to engage in a first area of the recess. Correspondingly, the second arm is embodied to engage in a second area of the recess. The first area and the second area are embodied on opposite sides of the connection piece in relation to the z-axis.

The retaining element having the two arms can be fork-shaped. In this case the two arms each correspond to a tine of a fork. The retaining element can also be described as U-shaped, each of the two arms corresponding to an arm of the U.

The fork- or U-shaped embodiment of the retaining element has the advantage that the device can easily be brought close to the connection piece. The actuator can therefore be mounted on the connection piece or valve connection piece in a particularly simple manner.

According to a further exemplary embodiment, the section of the retaining element is a connecting section on which the first arm and the second arm are mounted. This has the advantage that when the clamping device is actuated subsections of both arms are automatically displaced parallel to the z-axis relative to the connecting chassis. As a result of the actuation of a single clamping device, which, as described above can comprise a single screw for example, the two arms can therefore be moved simultaneously and the connection piece, in whose recess the two arms engage, can be brought up to the connecting chassis in a simple and efficient manner.

It is pointed out that in general the valve body in a piping system and consequently also the connection piece of the valve body are fixed in space. This means that the connecting chassis is then brought close to the connection piece.

The connecting section can be a central region of the retaining device from which the two arms extend along their longitudinal direction. This means that the two arms converge in the connecting section of the retaining element.

The retaining element can be embodied as a single piece, made of metal for example. On the other hand the connecting section and the two arms can also be a plurality of originally separate components which have been assembled in a suitable manner.

According to another exemplary embodiment, the coupling device additionally has an assembly aid facility which in the vicinity of the end of at least one of the two arms has a snap-in element which is configured in such a way that the retaining element, when moved in relation to the z-axis in the radial direction toward the connection piece, locks into place at a predetermined radial position. The described assembly aid facility can be implemented for example in such a way that a snap-fit mechanism is embodied or mounted on at least one of the two arms of the retaining element. On the other hand the snap-in element can also be a separate component which is mounted in a suitable manner on the end of the respective arm and/or which encloses the retaining element on the outside.

The described radial position can be in particular the final radial end position of the retaining device relative to the connection piece. This enables an installer to secure the actuator to the valve or valve body in a particularly simple manner. After the retaining element has been snapped in place the installer is namely able to concentrate exclusively on establishing a connection between a displaceable coupling element of the actuator and the plunger of the valve.

According to a further exemplary embodiment, the at least one retaining element is shaped in such a way that the retaining element, when moved in relation to the z-axis in the radial direction relative to the connection piece, locks into place at a predetermined further radial position. In this radial position the connecting chassis cannot fall out of the connection piece, for example.

The described further radial position can be referred to as an assembly position. In the assembly position the retaining element has a radial offset in relation to the connecting chassis. In this position it can be made possible for example for an operator to mount the connecting chassis on the connection piece without having to keep hold of the retaining element separately and without the retaining element being in the way during this operation.

According to another exemplary embodiment, the retaining element has a solid retaining structure and the assembly aid facility has an external cover enclosing the solid retaining structure. In this case the cover can also be described as an enclosure which encloses the retaining structure in the radial direction at least in relation to the z-axis. Preferably there is no cover on the inside of the retaining structure viewed in the radial direction, i.e. in particular between the two arms of the solid retaining structure. Such an internal part of the cover could namely have a disadvantageous effect on the engagement of the retaining element in the recess of the connection piece.

The above-described at least one snap-fit element can be mounted or embodied on the cover or enclosure. This has the advantage that the cover can simply represent an assembly aid which after completion of the installation of the actuator on the valve no longer serves any further function. The cover is not important, in particular in terms of the stability of the system including connecting chassis, retaining element, clamping element and connection piece or valve body.

It is pointed out however that the enclosing outer cover can still have a protective effect independently of the above-described functionality. This also applies even if the cover, as just explained, is not significant in terms of the mechanical stability of the system. Thus, for example, the enclosing outer cover can nonetheless protect the valve and/or the actuator against undesirable contamination, against dust and dirt for example.

According to a further aspect, an actuator for a valve, in particular for a valve of a heating, ventilation and/or air conditioning system, is described. The described actuator has (a) a housing, (b) a connecting chassis mounted on the housing, and (c) a device of the above-described type, the retaining element of the device being mounted on the connecting chassis.

The described actuator is based on the knowledge that when the above-described coupling device is used the actuator can be mounted on the connection piece of the valve body in a simple, efficient and in particular clearly defined manner with regard to possible assembly errors.

The connecting chassis and the housing can be embodied as a single piece or the connecting chassis can alternatively be mounted on the housing by a suitable mechanical connection, for example a connection by bolts or screws.

According to another exemplary embodiment, the actuator additionally has a motor which can be coupled to the plunger of the valve. The described actuator can therefore be an electromechanical actuator which effects a suitable setting of the valve when electrically driven in a suitable manner.

It is pointed out that the motor can be based on different physical interaction principles. Thus, the motor can be not only a conventional electromagnetic motor, but also, for example, an electrohydraulic motor or a pneumatic motor.

According to a further aspect, a method is described for mechanically coupling an actuator of the kind to a valve which is adjustable by a plunger that is displaceable along a z-axis. The method comprises (a) a positioning of the actuator in the direction of the connection piece, (b) a radial displacing of the retaining element from a starting position into an end position such that the retaining element engages in the recess which is incorporated on two opposite sides of the connection piece, and (c) actuating a clamping device which is disposed on a section of the retaining element, thereby causing the section of the retaining element to be displaced parallel to the z-axis relative to the connecting chassis such that the connecting chassis bears against the connection piece.

The described method is also based on the knowledge that the retaining element can be installed in the recess embodied in the connection piece of the valve body simply by a radial movement in relation to the axial direction of the valve plunger and can be pushed into the end position. Before the described actuation of the clamping device the retaining element has sufficient play relative to the connection piece to enable the retaining element to be mounted without a tool even by an untrained operator. Actuating the clamping device causes the section to be pressed against the connecting chassis and at the same time the connection piece, in whose recess the retaining element engages, is pressed against the connecting chassis. As already mentioned above, in the case of a stationary connection piece the connecting chassis is of course pressed against the connection piece when the clamping device is actuated. In this manner, the relative spatial position between the actuator and the valve is defined free from play in particular in terms of the relative axial position of the two components. As a result it can be ensured in a simple and efficient manner that a precisely defined setting of the valve can be unambiguously assigned to a specific position of the actuator. This enables the actuator to control the valve in a particularly precise manner.

According to a further exemplary embodiment, the starting position is an assembly position in which the retaining element has a predetermined radial offset in relation to the connecting chassis and/or in relation to the connection piece.

The assembly position and/or the end position can in this case be defined by the above-described snap-in elements embodied or mounted on the retaining element in conjunction with corresponding latching structures. In this case the respective snap-in element can lock into place at any edge or shoulder of the connecting chassis.

A correct positioning of the connecting chassis or the actuator can be effected for example by a simple placing of the connecting chassis onto the connection piece of the valve body. As long as the retaining element is located in the assembly position it cannot impede a placing of the connecting chassis onto the connection piece.

It is pointed out that embodiment variants have been described in relation to different objects. In particular some embodiment variants are described with regard to a device and other embodiment variants are with regard to a method. It will however be immediately clear to the person skilled in the art when reading this application that, unless explicitly stated to the contrary, in addition to a combination of features which belong to one type of object, any arbitrary combination of features is also possible which belong to different types of objects.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2a shows the retaining element in a perspective view, illustrating the manner in which it engages in an annular groove embodied on the connection piece.

FIG. 2b shows in a cross-sectional view a lifting of a connecting section of the retaining element by a clamping device.

DETAILED DESCRIPTION OF THE PREFERRED EMBODIMENT

Figure 1:
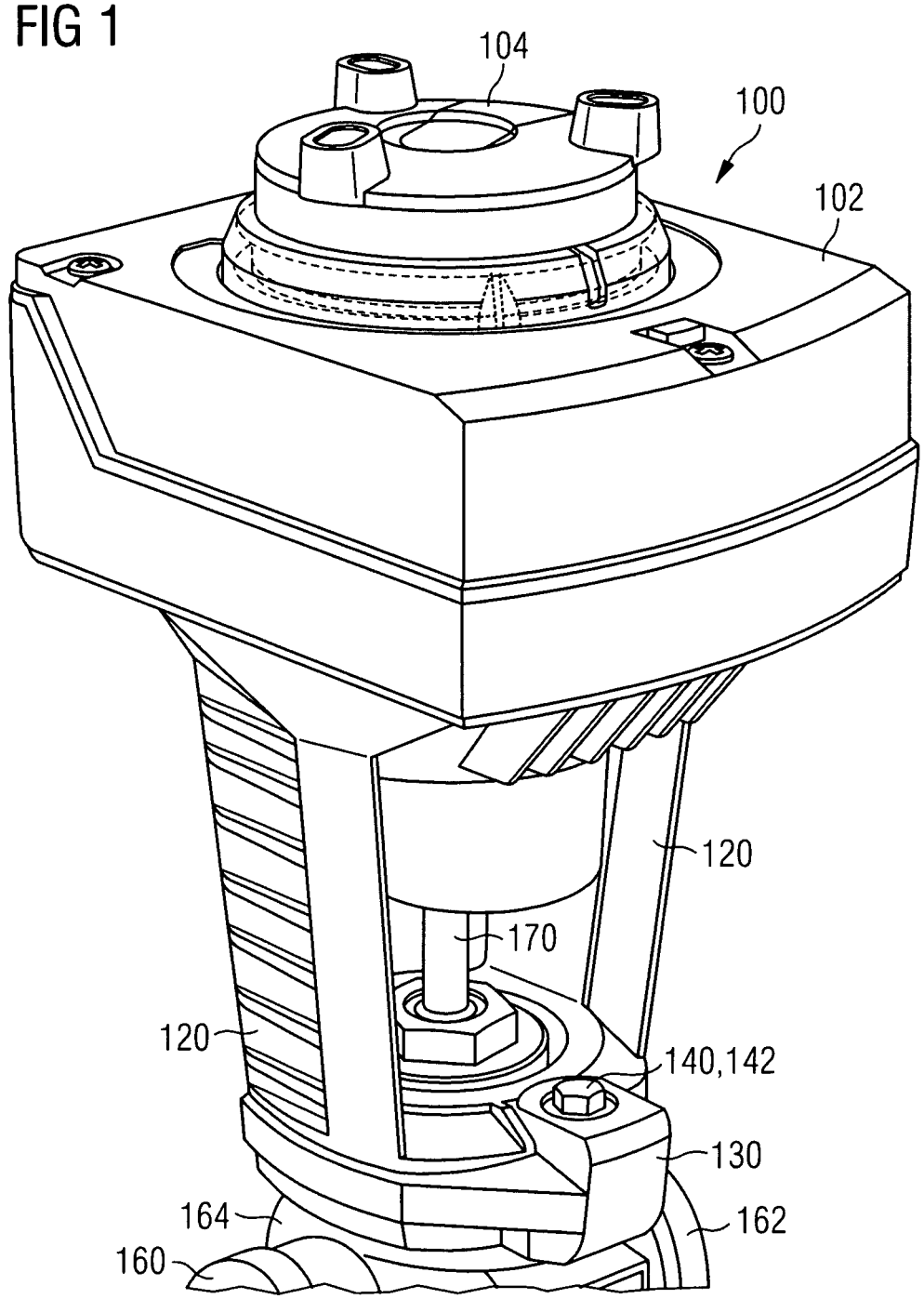
FIG. 1 shows in a perspective view an actuator which is fixed precisely in position on a connection piece of a valve body by a retaining element according to an exemplary embodiment of the inventors' proposals.

Reference will now be made in detail to the preferred embodiments of the present invention, examples of which are illustrated in the accompanying drawings, wherein like reference numerals refer to like elements throughout.

It is pointed out that features or components of different embodiment variants which are identical or at least functionally identical to the corresponding features or components of the first-cited embodiment variant are labeled with the same reference numerals or with a different reference numeral which differs from the reference numeral of a corresponding component only in its first digit. In order to avoid unnecessary repetitions, features or components already explained with reference to a previously described embodiment variant will not be explained in detail again later. In the drawings, reference numeral 106 represents a transparent cover/viewing window, and reference numeral 108 represents a marking.

It is furthermore pointed out that the embodiment variants described below merely represent a limited selection of possible embodiment variants. In particular it is possible to combine the features of individual embodiment variants in a suitable manner with one another such that for the person skilled in the art a multiplicity of different embodiment variants shall be deemed self-evidently disclosed with the embodiment variants explicitly described herein.

FIG. 1 shows in a perspective view an actuator 100 which is fixed precisely in position to a connection piece (also referred to as a "neck valve") 164 of a valve body 160. The connection piece can also be referred to as a valve neck 164. Also embodied on the valve body 160 is a connecting thread 162 for a pipeline.

The actuator 100 has a housing 102 which also functions as a cover. Disposed in the housing 102 is an electric motor (not shown) by which the actuator 100 can be driven in accordance with an electrical activation of the motor. Located on the top side of the housing 102 is a manual actuating element 104 by which the actuator 100 can be adjusted manually as necessary by an operator. For a manual adjustment of the actuator 100 the motor can be decoupled (in a manner that is not shown) from a drive rod (not shown) of the actuator 100.

The actuator 100 also has a connecting chassis 120 which is secured to the housing 102 for example by a screw connection. According to the exemplary embodiment shown here the connecting chassis is made from the material aluminum and therefore can also be referred to as the aluminum console 120.

The connecting chassis 120 is secured to the connection piece 164 of the valve body 160 by a retaining element 130 that has two arms and is mounted on the connecting chassis 120. By a clamping device 140 which according to the exemplary embodiment shown here is embodied as a bolt or screw 142, a connecting section of the retaining element 130 linking the two arms is lifted in the axial direction in the direction of the connecting chassis. Since the two arms engage in an annular groove (not shown in FIG. 1) of the connection piece 164, the connecting chassis 120 is in this way pressed against the connection piece 164 and in this way the relative axial position between connection piece 164 and connecting chassis 120 is precisely defined. This spatial fixing is explained in greater detail below with reference to FIGS. 2a, 2b, 2c and 2d.

FIG. 2a shows the retaining element 130 in a perspective view, illustrating the manner in which it engages in an annular groove 266 embodied on the connection piece 164. According to the exemplary embodiment shown here the retaining element 130 is fork-shaped or has a U shape with two arms, a first arm 232 and a second arm 234. The two arms 232, 234 are connected to each other via a connecting section to form a mechanically largely rigid structure. The connecting section, designated by the reference sign 230a in FIG. 2b, is located between the screw 142 and a central part of an outer cover 238. The two arms 232 and 234 as well as the connecting section (not shown in FIG. 2a) can be manufactured from a stable material, in particular from metal, and form a solid retaining structure.

As can be seen from FIG. 2a, according to the exemplary embodiment shown here the connection piece 164 has a shoulder 268 running around the circumference of the connection piece 164. Also disposed on the connection piece 164 is a valve cover 272 in which is embodied a through-hole 273 for the plunger 170 (not shown in FIG. 2a; see FIG. 1).

As can also be seen from FIG. 2a, the cover 238 (enclosing outer cover/assembly aid facility) encloses the two arms 232 and 234 and also the connecting section of the retaining element 130. A snap-in element 239 is embodied at the ends of the cover in each case in the vicinity of the end of an arm. The snap-in elements 239 are configured in such a way that the retaining element 130, when pushed in relation to a z-axis in the radial direction onto the connection piece 164, locks into place at a predetermined radial position. According to the exemplary embodiment shown here the retaining element 130 locks into place onto the connection piece 164 precisely twice in the case of such a radial displacement.

A first snap-in position is a so-called assembly position in which the connecting chassis 120 has a radial offset in relation to the z-axis. In this position it can be made possible for example for an operator to mount the connecting chassis 120 on the connection piece 164 without having to keep hold of the retaining element 130 separately. After the connecting chassis 120 has been mounted on the connection piece 164 the retaining element 130 can then be pushed radially into the second snap-in position. The second snap-in position can then represent the radial end position of the connecting chassis 120 relative to the connection piece 164. In this end position the connecting chassis can then be fixed precisely in position and axially free from play on the connection piece 164 by lifting of the connecting section 230a and consequently also by lifting of the arm sections which engage in the annular groove. Furthermore the plunger 170 can be connected to the coupling element of the actuator 100 in this end position.

By virtue of the above-described effect of the outer cover 238 and in particular of the snap-in elements 239 of the outer cover 238 the outer cover 238 can also be referred to as an assembly aid facility 238.

FIG. 2b shows in a cross-sectional view the retaining element 130 which fixes the connecting chassis 120 precisely in position and free from play on the connection piece 164 in the axial z-direction by a lifting of the connecting section 230a. The connecting section 230a of the retaining element is selectively lifted relative to the annular groove 266 of the connection piece 164 by the clamping device 140 which according to the exemplary embodiment shown here has the screw 142 and a clamping element 244 embodied as a clamping plate. This happens through the clamping plate 244 which has a hole with an internal thread into which the screw 142 engages with a complementary external thread. Thus, the position of the clamping plate 244 is varied upward or downward, according to the direction of rotation, by a rotation of the screw 142 in FIG. 2b.

The end sections of the two arms of the retaining element 130 which are assembled at the connecting section are not lifted by the clamping device. Rather, as can be seen in FIG. 2d, said end sections bear in each case against a supporting region or supporting point 222 of the connecting chassis 120. However, when the connecting section 230a is lifted, the middle sections of the two arms which engage in the annular groove 266 are lifted. In this case the degree of lifting is produced in accordance with the generally known lever principles from the degree of lifting of the connecting section 230a and the ratio between (a) the distance between the respective middle section and the connecting section 230a and (b) the distance between the respective end section and the connecting section 230a. The distances are in this case projected onto the drawing plane of FIG. 2b.

As a result of the lifting of the two middle sections, as already described above, the connecting chassis 120 is fixed free from play to the connection piece 164.

As can be seen from FIG. 2b, the clamping device 140 has a stop 269. This stop 269 ensures that the retaining element 130 does not lose its functionality even if the screw 142 is turned further in spite of the connecting chassis 120 already bearing against the connection piece 164. The stop 269 serves namely to define the maximum distance the connecting section 230a can be lifted. Said distance is dimensioned such that the retaining element 130 can be deformed elastically and plastically only to the permissible degree. In this way damage to the retaining element 130 and consequently to the entire coupling device can be precluded if the clamping device 140 is actuated with excessive force.

Figure 2C:
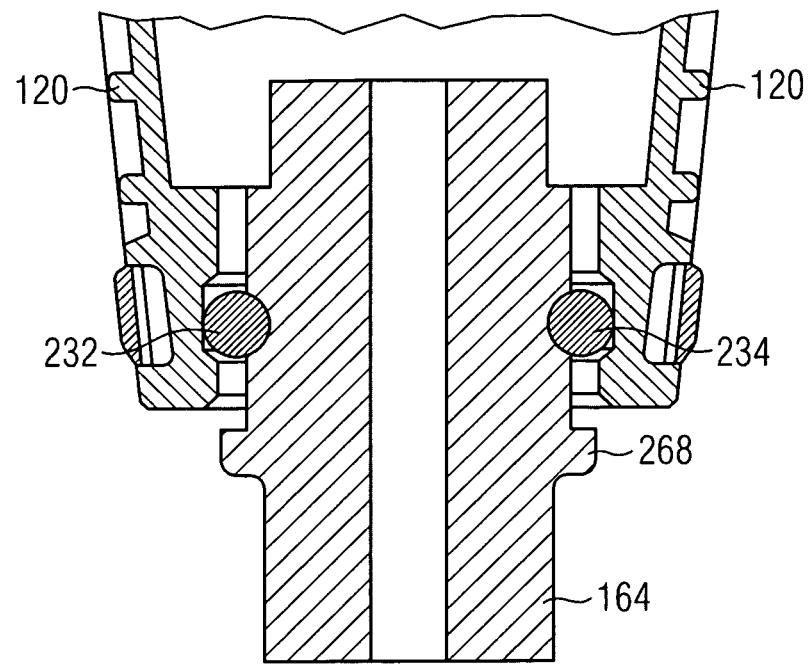
FIG. 2c shows the retaining element in a cross-sectional view, illustrating the manner in which it engages in an annular groove embodied on the connection piece.
Figure 2D:
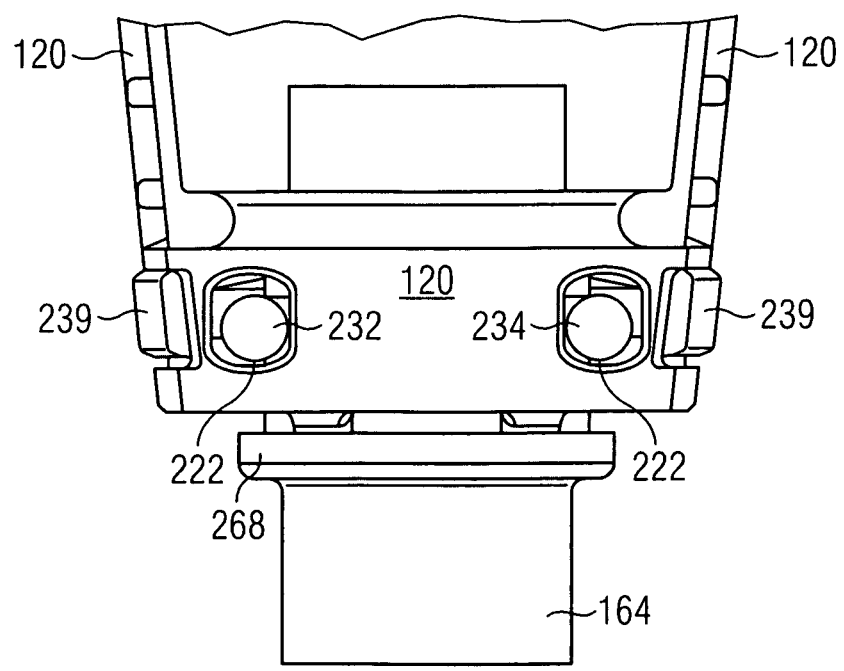
FIG. 2d shows the retaining element mounted on the connecting chassis and engaging in the annular groove.

FIG. 2c shows the two arms 232 and 234 of the retaining element in a cross-sectional view, illustrating the manner in which they engage in the annular groove embodied on the connection piece 164. The sectional plane of the cross-sectional view of FIG. 2c is normal to the sectional plane of the cross-sectional view of FIG. 2b.

FIG. 2d shows in a plan view the retaining element mounted on the connecting chassis 120 and engaging in the annular groove, of which retaining element only the ends of the two arms 232 and 234 can be seen. Also evident are the two snap-in elements 239 which are embodied at the two ends of the outer cover enclosing the retaining element 130. As is clear from FIG. 2d, the lower part of the connecting chassis 120 has two openings through which the retaining element or the two arms 232 and 234 of the retaining element can be inserted.

FIGS. 3a to 3h show a sequence of different assembly steps for mechanically coupling the actuator 100 to an HVAC valve using a retaining element 130 mounted on a connecting chassis 120 of the actuator 100.

Figure 3B:
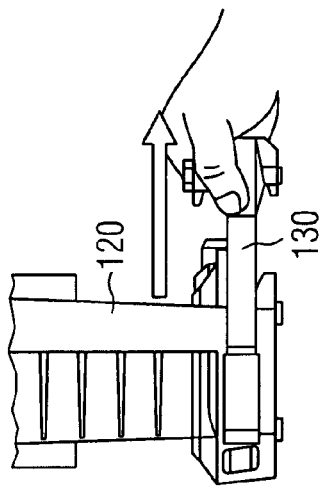
FIGS. 3a to 3h show a sequence of different assembly steps for mechanically coupling the actuator to an HVAC valve using a retaining element mounted on a connecting chassis of the actuator.
Figure 3D:
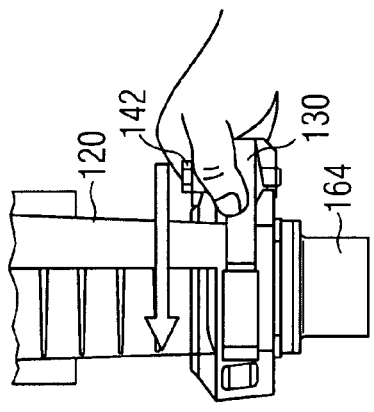
Figure 3A:
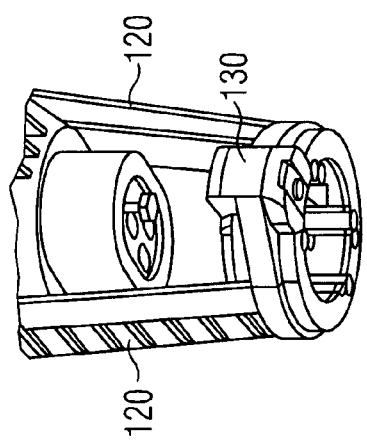

FIG. 3a shows a first assembly step. In this step a drive spindle of the actuator 100 is initially moved such that an axially displaceable coupling element is located in an upper stop position. The coupling element serves subsequently for connecting a coupling element of the actuator to the plunger 170 of the HVAC valve. As can be seen from FIG. 3a, the retaining element 130 is already mounted on the connecting chassis 120.

FIG. 3b shows a second assembly step. In this step the retaining element 130 is displaced radially outward into an assembly position. The assembly position is in this case defined by the snap-in elements 239 shown in FIG. 2a which lock into place on the connecting chassis 120 in such a way that the retaining element is located radially offset with respect to the connecting chassis 120. The retaining element 130 is advantageously prevented from slipping out further radially by the snap-in elements 239.

Figure 3C:
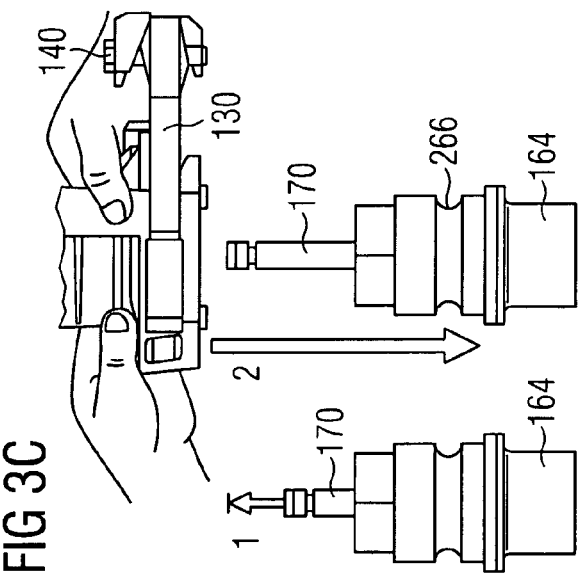

FIG. 3c shows a third assembly step. In this step the plunger 170 of the valve is initially pushed upward. This facilitates a subsequent connection of the plunger 170 to the coupling element of the actuator 100. After the plunger 170 has been lifted the connecting chassis 120 is placed onto the connection piece or onto the valve neck 164. Since the retaining element 130 is still located in the assembly position, the connecting chassis 120 can be placed on without being obstructed by the retaining element 130.

FIG. 3d shows a fourth assembly step. In this step the retaining element 130 is pushed from the assembly position radially inward into the end position. In the end position the two arms of the retaining element engage from outside in the annular groove 266. As a result the relative position between connecting chassis 120 or actuator 100 on one side and the connection piece 164 or valve on the other side is defined except for a small degree of play in the axial direction (along the z-axis) and the rotation angle position around the z-axis.

Figure 3E:
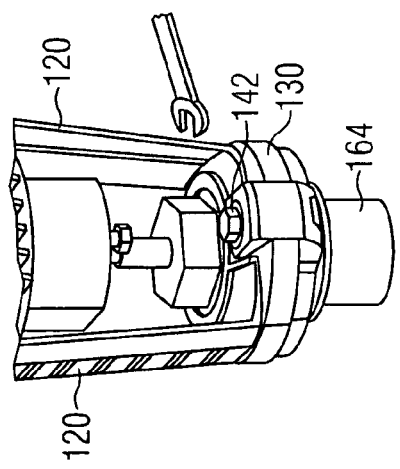

FIG. 3e shows a fifth assembly step. In this step the screw 142 of the clamping device is tightened by a wrench. As already described above, this causes the connecting section 230a of the retaining element 130 to be lifted. As likewise described in detail above, this also causes the middle sections of the two arms which engage in the annular groove to be lifted. As a result a play-free spatial fixing of the system including connecting chassis 120, retaining element 130 and valve is achieved.

Figure 3F:
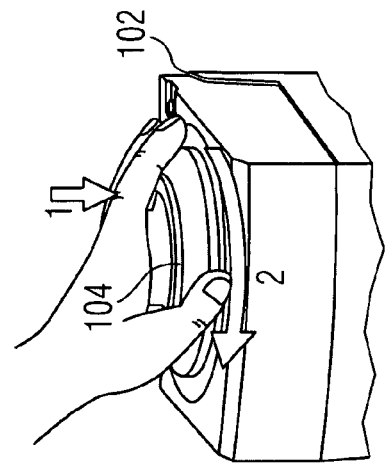

FIG. 3f shows a sixth assembly step. In this step the manual actuating element 104 is rotated by an operator such that the coupling element of the actuator 100 moves axially with respect to the plunger 170.

Figure 3G:
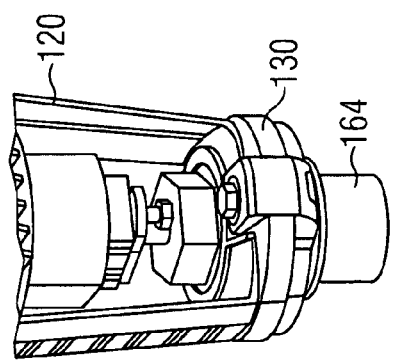

FIG. 3g shows a seventh assembly step. The coupling element and the plunger 170 are located so close together that they can be connected to each other.

Figure 3H:
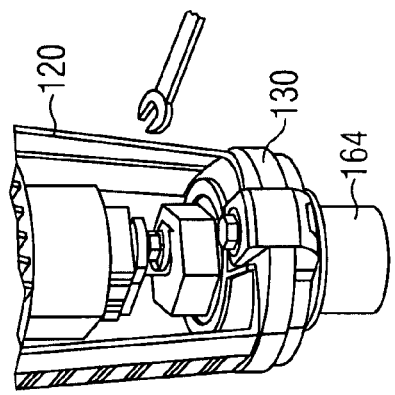

FIG. 3h shows an eight assembly step. The coupling element and the plunger 170 are connected to each other. According to the exemplary embodiment shown here an ordinary wrench is used for this purpose.

In summary it remains to be stated:

A connection that is free from play in the axial direction can be established in a simple manner by the coupling, described in this document, between a connecting chassis of an actuator and a connection piece of a valve, in particular an HVAC valve. The described assembly of valve and actuator can be carried out at an arbitrary rotation angle position around the plunger axis. Assembly and disassembly of the actuator can be carried out by ordinary technical staff using standard tools. Assembly is simple and clearly defined, so assembly errors can be ruled out with a high degree of certainty. No loose, losable small parts such as screws or nuts are required for assembly and/or disassembly. The screw of the clamping device can be staked at the start of the thread in such a way that it cannot be lost. The entire coupled system including valve and actuator is secured by turning the screw of the clamping device. An installer can recognize correct assembly of the system in a simple and reliable manner by the tightening of the screw.

The U-shaped retaining element leads to a form-fit connection between the connecting chassis and the valve neck. The coupling is closed and a positive form-fit produced by a radial displacement of the retaining element. The U-shaped retaining element is braced axially by the clamping device. The components connecting chassis, valve neck and retaining element are fixed relative to one another free from play owing to the resulting clamping effect. A clearly defined axial positioning of connecting chassis and valve neck is ensured as a result.

Should the connecting chassis be very severely corroded for example, then the described coupling can be destructively opened in a short time without the valve neck being damaged.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A device to mechanically couple an actuator to a valve which is adjustable using a plunger that is displaceable in an axial direction, the device comprising:

a retaining element configured to be mounted on a connecting chassis of the actuator, the connecting chassis connecting the actuator and the valve and extending in the axial direction to engage a connection piece of a valve body of the valve, the retaining element being configured to be engaged with two opposite sides of the connection piece in a recess incorporated in the connection piece; and a clamping device that is disposed on a section of the retaining element and configured such that, when the clamping device is actuated, the section of the retaining element on which the clamping device is disposed is displaced parallel to the axial direction relative to the connecting chassis such that the connecting chassis of the actuator bears against the connection piece of the valve body, and wherein the retaining element engages an area of the recess via a snap-in element, the snap-in element locking the retaining element into place at a predetermined radial position when the retaining element is moved in a radial direction onto the connection piece relative to the axial direction of the connection chassis.

2. The device as claimed in claim 1, wherein the clamping device has a screw and a clamping element coupled to the screw via a thread of the screw.

3. The device as claimed in claim 1, wherein the recess is a groove.

4. The device as claimed in claim 3, wherein the groove is an annular groove running at least partially around a circumference of the connection piece.

5. The device as claimed in claim 1, wherein the retaining element has a first arm and a second arm, and the first arm is configured to engage a first area of the recess and the second arm is configured to engage a second area of the recess, the first area and the second area being on opposite sides of the connection piece with respect to the axial direction.

6. The device as claimed in claim 5, wherein the section of the retaining element on which the clamping device is disposed is a connecting section on which the first arm and the second arm are mounted.

7. The device as claimed in claim 6, wherein the at least one snap-in element positioned in a vicinity of an end of at least one of the first arm and the second arm.

8. The device as claimed in claim 7, wherein the retaining element is shaped such that the retaining element, locks into place at a predetermined further radial position via another snap-in element.

9. The device as claimed in claim 8, wherein the retaining element has a solid retaining structure, and the assembly aid facility has an outer cover enclosing the solid retaining structure.

10. An actuator for a valve of a heating, ventilation and/or air conditioning system, the actuator comprising:
    a housing;
    a connecting chassis mounted on the housing; and
    a device as claimed in claim 1, wherein the retaining element of the device is mounted on the connecting chassis of the actuator.

11. The actuator as claimed in claim 10, comprising:
    a motor configured to be coupled to a plunger of the valve.

12. A method to mechanically couple an actuator to a valve, which is adjustable by means of a plunger, the method comprising:
    positioning the actuator in a direction of a connection piece connecting the actuator with a valve body of the valve;
    radially displacing a retaining element from a starting position into an end position such that the retaining element engages in a recess incorporated in the connection piece; and
    actuating a clamping device disposed on a section of the retaining element to cause the section of the retaining element on which the clamping device is disposed to be displaced parallel to an axial direction relative to a connecting chassis connecting the actuator and the valve such that the connecting chassis bears against the connection piece, and
    wherein the retaining element is mounted on the connecting chassis of the actuator and
    wherein the retaining element engages an area of the recess via a snap-in element, the snap-in element locking the retaining element into place at a predetermined radial position when the retaining element is moved in a radial direction onto the connection piece relative to the axial direction of the connection chassis.

13. The method as claimed in claim 12, wherein the starting position is an assembly position in which the retaining element has a predetermined radial offset in relation to the connecting chassis and/or in relation to the connection piece.

\* \* \* \* \*